Feb. 18, 1964      T. J. SCARPA ETAL      3,121,353
DEVICE FOR WELDING METAL FOILS AND THE LIKE
Original Filed May 26, 1958      2 Sheets-Sheet 1
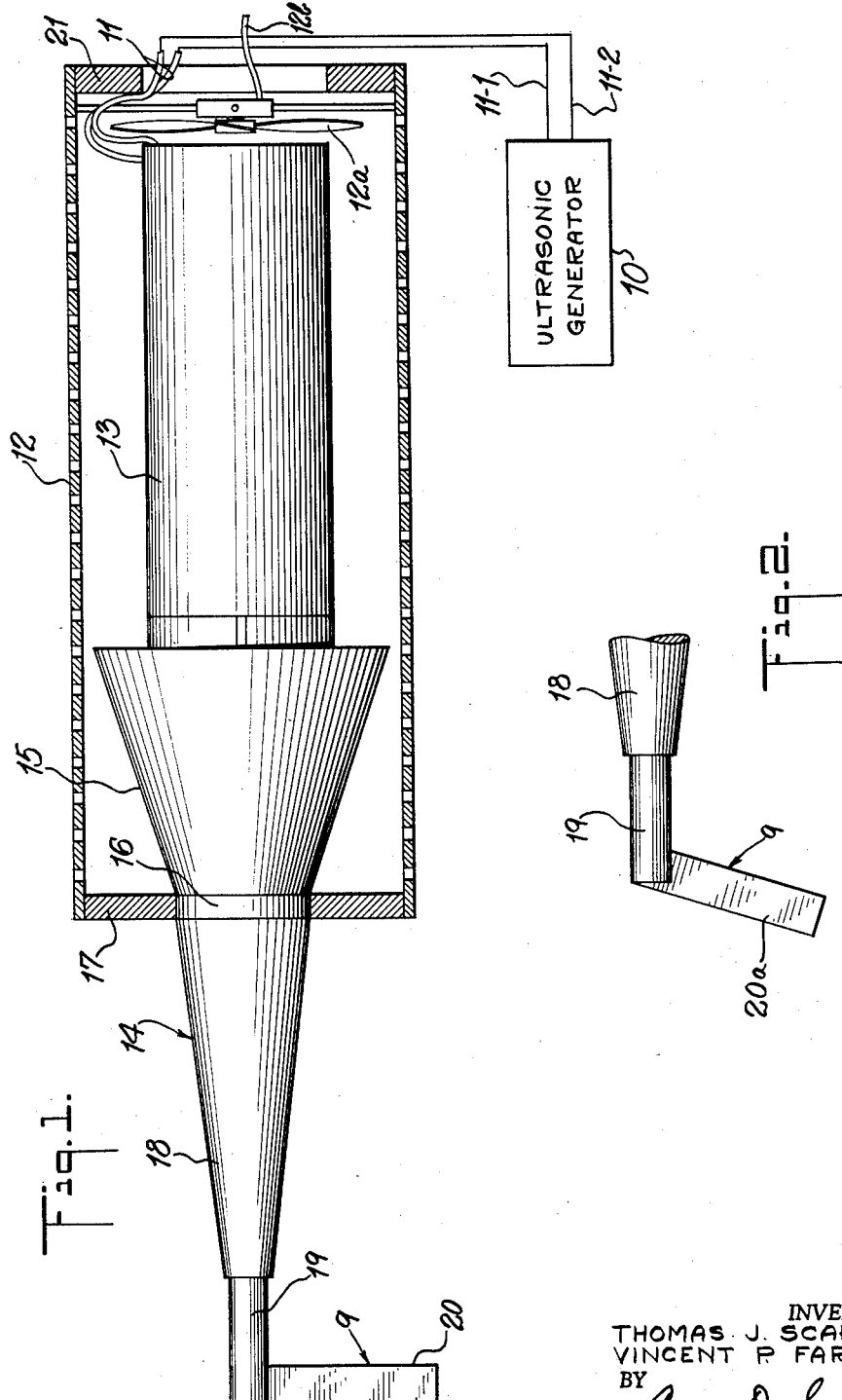
INVENTORS
THOMAS J. SCARPA
VINCENT P. FARLEY
BY
*Cyrus D. Samuelson*
ATTORNEY

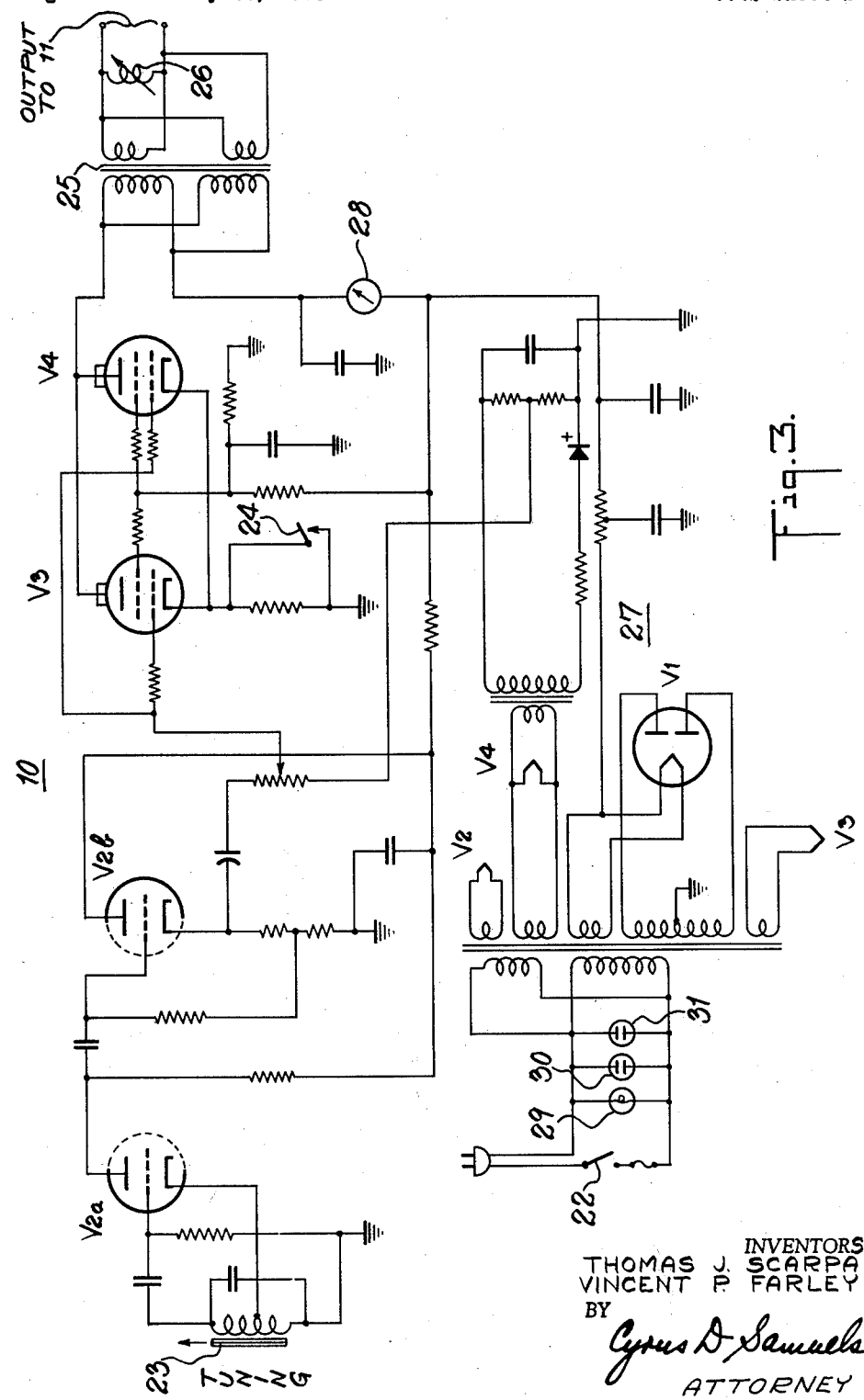

3,121,353
DEVICE FOR WELDING METAL FOILS AND THE LIKE

Thomas J. Scarpa and Vincent P. Farley, both of Metuchen, N.J., assignors to Gulton Industries, Inc., Metuchen, N.J., a corporation of New Jersey
Original application May 26, 1958, Ser. No. 737,795. Divided and this application Feb. 8, 1962, Ser. No. 179,832
4 Claims. (Cl. 78—82)

Our invention relates to a device for welding metal foils and the like by ultrasonic means. This application is a division of application Serial No. 737,795, filed May 26, 1958 on a Method of Welding Metal Foils and Device Therefor.

Up to now, ultrasonic welding equipment has been similar to ultrasonic drilling equipment, in that the axis of the tool (the tip attached at the small end of the generally employed mechanical transformer) was substantially in line with the axis of the mechanical transformer. In effect, the tool vibrates in longitudinal mode. This imposes a limitation on the position in which the tool can be placed in order to obtain good welds. We have found that it is advantageous to employ a thin blade type tool which makes an angle of approximately 90° or more with the axis of the mechanical transformer. Preferably, angles from 90° to 120° have been found most satisfactory for welding metal foils when using devices of our invention. By placing the tool at an angle to the axis of the mechanical transformer, we have been able to transform the longitudinal mode of vibration in the mechanical transformer to a transverse mode of vibration in the tool. By the term "transverse mode" is meant that mode of vibration which is perpendicular to the direction of movement of the direction of propagation of acoustical waves in the body of the media involved.

In order to obtain maximum efficiency, we employ a tool which is tuned to the frequency of the ultrasonic generator by making the length of the tool equal to an integral multiple of a half wavelength of the excitation frequency. Preferably, we make the length of the tool equal to one half the wavelength of the excitation frequency. Since it has been found that ultrasonic welding is best accomplished by use of the shear mode, we have determined that the employment of a tuned tool is far superior to the prior art technique wherein the reed is resonated in its longitudinal mode and its motion is applied perpendicular to the work or wherein an untuned disc is affixed perpendicular to the mechanical transformer and is driven in an untuned shear mode.

It is a further object of our invention to provide such a device wherein the longitudinal mode of vibration of the mechanical transformer is converted to a transverse mode of vibration in the tool.

It is a still further object of our invention to provide such a device which is light in weight and economical to produce and operate.

It is a still further object of our invention to provide such a device which may be operated while being held in the hand.

Other objects, features and advantages of our invention will be apparent during the course of the following description when taken in conjunction with the accompanying drawings wherein:

FIGURE 1 is a side elevational view, partly in section and partly in schematic block form, of a preferred embodiment of our invention, FIGURE 2 is a side elevational view of a modified form of the tool of our invention, and FIGURE 3 is a schematic circuit diagram of a preferred form of ultrasonic generator for providing excitation to the welder of our invention.

In the drawings, wherein, for the purpose of illustration, are shown preferred embodiments of our invention, the numeral 10 designates the ultrasonic generator, generally. The output of ultrasonic generator 10 is fed by means of cable 11 to the electrodes of transducer 13 (details of electrodes not shown). Cable 11 contains leads 11–1 and 11–2, lead 11–1 being connected to the outer electrode of transducer 13 and lead 11–2 being connected to the inner electrode of transducer 13. We prefer transducer 13 to be an electromechanically sensitive body which is a hollow cylinder in shape. In the embodiment illustrated, transducer 13 is formed of piezoelectric ceramic material composed largely of barium titanate. However, any other type and shape of electromechanically sensitive body may be used. Transducer 13 is suitably affixed to the large base of mechanical transformer 14 by means of an epoxy plastic or polymer with proper adhesive and acoustical properties.

Mechanical transformer 14 is a dual cone comprising conical portion 15, cylindrical portion 16 and conical portion 18. Cylindrical portion 16 is located at the nodal surface of mechanical transformer 14 at which surface the combination is welded or otherwise suitably affixed to nodal flange 17. If desired, nodal flange 17 and mechanical transformer 14 may be formed from a single piece of material.

Nodal flange 17 is suitably affixed, by welding or otherwise, to housing 12 which is perforated to facilitate the cooling of transducer 13. End plate 21 is welded or otherwise affixed to housing 12 and is provided with an opening through which cable 11 is carried to ultrasonic generator 10. For forced air cooling, we provide fan 12a. Power for fan 12a is obtained from outlet 30 through cable 12b.

Tool 9 is comprised of shank 19 and blade 20 and is suitably affixed to the small end of 18 by brazing or similar means. Shank 19 is preferably formed of stainless steel and blade 20 is preferably formed of stainless steel. Blade 20 is affixed to shank 19 by brazing or similar means.

We have found that the angle between blade 20 and the axis of shank 19 which is an extension of the axis of mechanical transformer 14 should be between 90° and 120° and preferably should be close to 90°. In FIGURE 1, we have shown this angle to be 90° and in FIGURE 2, which illustrates an alternative embodiment of tool 9, we have shown this angle to be approximately 105°. We have discovered that the maximum energy transfer occurs when the end of blade 20 is at an antinode.

In FIGURE 3, there is shown a schematic diagram of ultrasonic generator 10 to be used to supply excitation to transducer 13. Switch 22 is the power switch which is provided to turn the equipment on and off. Dial light 29, outlet 30 and outlet 31 are also controlled by switch 22. Outlet 31 is provided for a fan (not shown) which may be used to cool ultrasonic generator 10. Power supply 27 provides voltage to the vacuum tubes of the generator in the usual manner which is well known in the art. Vacuum tube V2a is the oscillator whose frequency is tuned by variable inductor 23. The output of V2a is fed to amplifier V2b whose output is fed to the grids of V3 and V4 which are connected in parallel. The outputs of V3 and V4 are connected in parallel and thence to output transformer 25. Switch 24 serves to key the output of V3 and V4 to the output transformer 25. Across the secondary of transformer 25 is connected variable inductor 26 which is adjusted so as to obtain proper transfer of energy to transducer 13. Meter 28 is in the plate circuit of V3—V4 and is used as a tuning indicator when adjusting inductors 23 and 26.

By way of illustration and not by way of limitation of the scope of our invention, following is an example of an ultrasonic welding device of our invention:

Operating frequency—20 kc.

Transducer 13, formed largely of barium titanate, length—3¾", outside diameter—1½", inside diameter—1⅛".

Mechanical transformer 14, formed of stainless steel, diameter of base of conical portion 15—2.250", height of conical portion 15—1.94", diameter of bases of cylinder 16—1.070", height of cylinder 16—0.250", height of conical portion 18—2.75", diameter of shank 19—0.375", length of blade 20—1.125", thickness of blade 20—0.125".

Length of housing 12—7", outside diameter of housing 12—2.50", thickness of housing wall—1/16".

Thickness of nodal flange 17—0.250".

Under the conditions set forth in the example set forth just above, we have been able to weld metal foils of thickness of the order of 0.004 inch using the following method:

The metal foils to be welded are placed so that they overlap in the region wherein it is desired to form the weld and ultrasonic excitation is applied to the welder. Then, the tool is placed in contact with the foils and is moved along the desired seam. We have found that it is possible and practical to hold the foils to be welded in fixed positions and to move the welder along the seam. In such cases, the welder may be held in the hand or in a movable mechanical cradle and moved either by hand or by mechanical means. On the other hand, the welders of our invention may also be held in a fixed position and arranged so that the metal foils are moved with respect to the tool either by hand or by mechanical means.

We have found that foil welding may be accomplished, using the teachings of our invention within the frequency range of 15 kc. to 25 kc. but that the range of 18 kc. to 22 kc. is preferred.

It is also within the contemplation of our invention to utilize the ultrasonic device of Richard D. McGunigle where higher powers are required in order to weld thicker sheets of foil or when it is desirable to weld several thin sheets together. The device of Richard D. McGunigle has been described in his application for Letters Patent entitled Ultrasonic Device, Serial No. 731,744 and assigned to the assignee hereof.

It is possible by using the method of our invention to hermetically seal foods and other materials which are to be preserved for long periods of time in a controlled, sealed environment. In fact, it is within the contemplation of our invention to treat foods and other materials specially, by radiation, dehydration or other processes, and to seal the contents in aluminum or other thin non-contaminating metal foil immediately after treatment. This will prevent the contents from being exposed to any deleterious atmospheric conditions for too long a time. This technique is possible because no heat is used in carrying out our method of welding foils by ultrasonic means.

We have also welded all but a small portion of a seam and then removed most of the air from the inside and finished the seam. By this technique, one is able to achieve vacuum packing of materials in thin metal bags whereas previously vacuum packing has only been available in glass jars and relatively rigid metal cans.

While we have disclosed our invention in relation to specific examples and in specific embodiments, we do not wish to be limited thereto, for obvious modifications will occur to those skilled in the art without departing from the spirit and scope of our invention.

Having thus described our invention, we claim:

1. In a sonic welder comprising a sonic generator, a member mounted for vibrational movement along a given axis, means responsive to said sonic generator for vibrating said member along said axis at a sonic frequency, the improvement comprising: a welding tool affixed to the end of said member to be vibrated longitudinally along said axis, said tool comprising a longitudinally extending shank portion connected to said member and a thin blade extending laterally from the end of said shank portion, the plane of said blade extending generally parallel to said axis, the end of said blade constituting the work contacting portion of the tool and being vibrated by said member in a transverse mode where the blade end vibrates in a direction having a substantial component parallel to the plane of the blade.

2. The welder of claim 1 wherein said blade has a length equal to an integral multiple of half wave lengths at the frequency of vibration thereof.

3. The welder of claim 1 wherein said blade makes an angle of 90° with respect to said shank portion of the tool.

4. The sonic welder of claim 1 wherein said blade makes an obtuse angle with respect to the shank portion of said tool not exceeding 120°.

References Cited in the file of this patent

UNITED STATES PATENTS

| | | |
|---|---|---|
| 2,947,886 | McGunigle | Aug. 2, 1960 |
| 2,990,616 | Balamuth | July 4, 1961 |

FOREIGN PATENTS

| | | |
|---|---|---|
| 1,087,440 | France | Aug. 25, 1954 |